May 14, 1940. H. E. WEAVER 2,200,378

METER

Filed Aug. 19, 1933

INVENTOR
HARRY E. WEAVER.
BY
Raymond D. Jenkins
ATTORNEY

Patented May 14, 1940

2,200,378

UNITED STATES PATENT OFFICE 2,200,378

METER

Harry E. Weaver, South Euclid, Ohio, assignor to Bailey Meter Company, a corporation of Delaware Application August 19, 1933, Serial No. 685,911

7 Claims. (Cl. 177—351)

My invention relates to improvements in meters and is particularly directed to the electrical totalizing at either a local or a remote point of the reading of a plurality of mechanically operated meters such as fluid rate of flow meters.

The invention may, however, be adapted to the remote indicating, recording or integrating of fluid rate of flow from a single flow meter or, in fact, for the remote indicating of any variable or relation of variables, or for remote positioning, etc.

Figure 1:
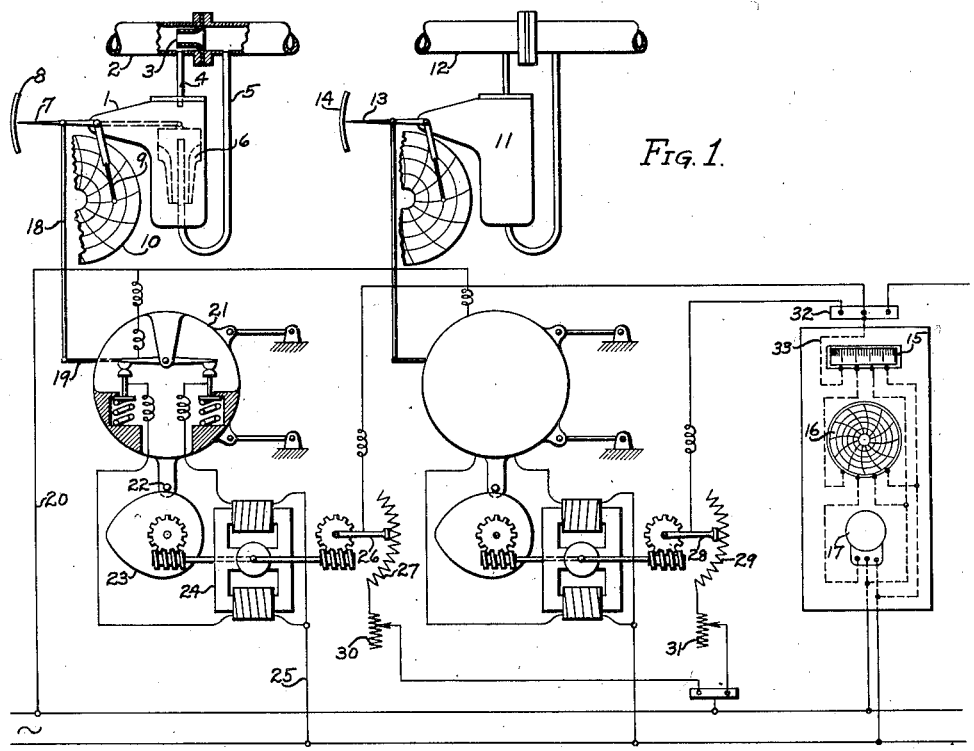
Fig. 1 illustrates in somewhat diagrammatic fashion the invention applied to the totalizing of a plurality of fluid rates of flow.

Referring first in detail to Fig. 1, I show a rate of flow meter 1 arranged to advise instantaneous values of the rate of flow of a fluid through a conduit 2. A pressure differential bearing a known quadratic relation to the rate of fluid flow through a nozzle 3 is applied through the pipes 4 and 5 upon the exterior and interior respectively of a liquid sealed bell 6 having shaped walls of material thickness whereby the vertical positioning of the bell will be directly responsive to fluid rate of flow rather than to differential pressure. The bell 6 is adapted to move a pivoted arm in angular rotation whereby a pointer 7 carried by the arm is moved relative to an index 8 to advise the instantaneous value of the fluid rate of flow. Further moved by the arm is a recording pin 9 relative to a chart 10.

At 11 I illustrate a meter similar to that designated as 1, for measuring the rate of fluid flow through the conduit 12 and advising the instantaneous value thereof through positioning the pointer 13 relative to an index 14.

Now in the embodiment of my invention which I have illustrated in Fig. 1, I preferably totalize the instantaneous values of the fluid rate of flow through the conduits 2 and 12, and do so through electrical agencies. I provide that the total flow be indicated or recorded, or integrated, either locally or remotely, as may be desired, upon the indicator 15, the recorder 16, or the integrator 17 of the drawing.

In connection with the meters 1, 11, I show electro-mechanical torque amplifiers positioned and controlled by the meters for varying the value of resistances in the circuit going to the devices for indicating the total flow.

From the arm 7 is pivotally suspended a link 18 pivotally joined at its lowermost end to a contact bar 19 which, through the wire 20, connects to one side of an alternating-current source of power. The contact bar 19 is pivoted intermediate the contacts which it carries, to a fixed point on a movable case 21, which case, as a whole, is adapted to be moved substantially vertically through the agency of a roller 22 carried by the case, bearing against the periphery of a cam 23.

The cam 23 does not make a complete revolution but is positioned in one direction or the other within limits, by a double field synchronous motor 24 whose rotation is controlled by the contacts in the case 21.

The pairs of contacts within the case 21 are normally close-circuited, thus completing circuits from the wire 20 through the two opposed fields of the motor 24 to the opposite side of the power line by the conductor 25. If, now, the fluid rate of flow should vary from that of the condition illustrated, in a direction for example, to increase, then the differential pressure effective through the pipes 4, 5 upon the bell 6 would cause the bell 6 to move vertically upwardly and correspondingly the link 18 would be moved downwardly, thus causing an open-circuiting of the right hand pair of contacts within the case 21.

Such an open-circuiting would deenergize one of the fields of the motor 24 to effect a rotation of the said motor in the desired direction, whereby the cam 23 would be rotated and the case 21 vertically lowered an amount sufficient to cause a close-circuiting of the right hand contacts whereby the synchronous motor 24 having both of its fields simultaneously energized, would be plugged to a substantially instantaneous stop.

Rotation of the rotor of the motor 24 while moving the cam 23, simultaneously causes a positioning of a contact arm 26 over a variable resistance 27. I illustrate at 28 and 29 a similar contact arm and similar variable resistance in connection with the flow meter 11.

One end of the resistance 27 is connected through the hand adjustable resistance 30 with the source of power, while similarly the resistance 29 is connected to the source of power through the hand adjustable resistance 31.

The contact arms 26, 28 lead to a terminal block 32 adjacent the indicating instruments, either locally or remotely relative to the flow meters. From the terminal block 32 a conductor 33 leads in series through the indicator 15, the recorder 16, and the integrator 17. The three instruments are connected in parallel by voltage leads to the source of power.

It will now be seen that the variable resistances 27, 29 are connected in parallel with each other to the instruments, and on a variation in the rate of fluid flow through either the conduit 2 or the conduit 12 there will be a variable amount of the resistance 27 or the resistance 29 in the circuit of the instruments. The arrangement is such that the instruments will totalize in terms of fluid rate of flow, or otherwise as desired, the total of the instantaneous value of the fluid passing through the two conduits and to integrate the total flow between definite periods of time.

As previously mentioned, the flow meters are so designed that the movement of the pointers 7, 13 is in direct relation to the rate of flow. The flow meters individually cause a varying of resistance which thereby varies the current value of the circuit related to the individual meter. There is a reciprocal relation between resistance and current so that the current is in reciprocal relation then to the flow. Two possibilities present themselves for straightening out such characteristics, namely, a shaping of the resistance 27, or a special shaping of the cam 23.

Figure 3:
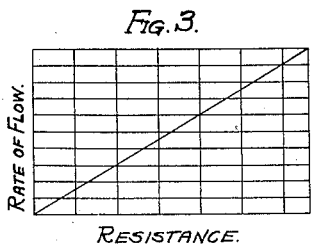
Figs. 3 and 4 are graphs of quantity relationships in the electrical system comprising the invention.
Figure 4:
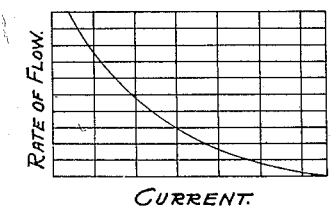

At Fig. 3 I illustrate the straight line relation existing between rate of flow and resistance, if the flow meter moves directly with resistance. At Fig. 4, I indicate the reciprocal relation between rate of flow and current, wherein the curves are inverse functions, that is, one is the reciprocal of the other. Now by shaping the cam 23, I vary the shape of the curve of Fig. 3 and thereby the relation between rate of flow and resistance so that the relation of Fig. 4 between rate of flow and current will be a straight line.

Now, the instruments 15, 16, 17 are admittance type meters which measure current substantially unaffected by voltage changes and have a practically straight line characteristic. Thus, utilizing this type of instrument in connection with the cam 23 of special shape, or the resistances 27, 29 of special shape, I am able to indicate and record directly or in straight line relation, the rate of fluid flow.

Figure 2:
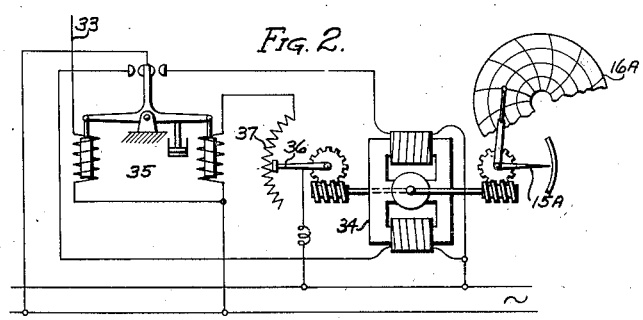
Fig. 2 is a modification of a part of Fig. 1.

At Fig. 2 I illustrate a modification of the remote recording or indicating arrangement. I illustrate at 33 the conductor which corresponds to the conductor 33 of Fig. 1 leading from the terminal block 32. The remainder of Fig. 2 would be substituted for the panel board of Fig. 1 containing the instruments 15, 16 and 17. I show the recorder 16A and the indicator 15A in Fig. 2 as positioned by a reversing synchronous motor 34 which is controlled by a balanced relay 35 and is adapted, in addition to positioning the pen and indicator relative to the instrument, to also move a contact arm 36 relative to a variable resistance 37.

Through the conductor 33 I impress upon one part of the balanced relay 35 the summation of the various flows and upon an opposing part of the balanced relay, I impress, through the agency of the resistance 37, a representation of the instrument reading of such totalized flows. Thus, the system is in balance if the recording upon the meter 16A and the indicating upon the indicator 15A is directly proportional to the totalized flow effective through the conductor 33.

In this arrangement, I balance the total resistance against the resistance 37 of the totalizer meter, and it is thus unnecessary to use specially shaped cams or resistances at the individual meters.

While I have illustrated and described a preferred arrangement in connection with the totalizing of fluid rates of flow, it will be apparent that the arrangement might be utilized for remotely subtracting values representative of variables, or for adding other variables or determining desired relation between variables. Such variables may be pressure, temperature, flow, or in fact, any variable of a physical, chemical, thermal, electrical, hydraulic, or other nature.

Having now illustrated and described one preferred embodiment of my invention, I desire it to be distinctly understood that I am to be limited thereto only by the claims in view of prior art.

What I claim as new, and desire to secure by Letters Patent of the United States, is:

1. Measuring apparatus for a variable comprising in combination, means positioned in accordance with the magnitude of the variable, an electric circuit, a slide wire resistance in said circuit, motor actuated means for varying said resistance, a cam revolved by said motor, means under the joint control of said first named means and said cam for controlling the energization of said motor, said cam being shaped to produce a current in said current proportional in magnitude to the position of said first named means, and current measuring means included in said circuit.

2. In a measuring apparatus for a variable, in combination, an indicator positioned from an initial position in proportion to the magnitude of the variable, an electric circuit, a resistance associated with said circuit, a movable contact arm engaging said resistance and determining the amount of resistance connected in said circuit, a motor having opposed fields for moving said contact arm, a beam having a neutral position, a fulcrum for supporting said beam, a link connecting one end of said beam to said indicator whereby said beam is angularly positioned about said fulcrum in accordance with changes in the position of said indicator, a first contact means controlled by said beam for effecting energization of one of the fields of said motor, a second contact means controlled by said beam for effecting energization of the other of the fields of said motor, said contacts disposed on opposite sides of said fulcrum, a carriage for supporting said fulcrum, means movable by said motor for positioning said carriage, and a device in said circuit for measuring the current flow through said resistance, whereby when said means is positioned from said neutral position said motor is operated to move said carriage to restore said beam to the neutral position and said contact arm is simultaneously moved by said motor to vary the resistance in said circuit proportional to the positioning of said beam from said neutral position.

3. In a telemetric transmitter for transmitting a non-lineal function of a variable, pressure responsive means having a portion movable in proportion to said variable, a shaft, a non-lineal cam mounted on said shaft and corresponding with the non-lineal relation between said function and said variable, an electric circuit, a contact controller included in said circuit and coacting with said cam and said pressure responsive means, a synchronous motor for revolving said cam and connected in said circuit whereby said motor is urged to rotation for increments of time bearing a non-linear functional relation to changes in the position of said movable portion.

4. In a torque amplifying mechanism for positioning a work shaft in accordance with a non-lineal function of a variable, in combination, a member movable in proportion to said variable, a work shaft, a non-lineal cam driven by said shaft and corresponding with the non-lineal relation between said function and variable, a circuit controller under the joint control of said cam and member, and a synchronous motor for revolving said shaft and cam under the control of said circuit controller whereby said shaft is revolved for increments of time proportional to changes in the displacement of said member.

5. In a torque amplifying mechanism for positioning a work shaft in accordance with a non-lineal function of a variable, in combination, a member movable in sense and amount corresponding to the sense and amount of change in the variable, a work shaft, a non-lineal cam driven by said shaft and corresponding with the non-lineal relation between said function and variable, a motor for revolving said shaft having opposed windings which when simultaneously energized do not urge the motor to rotation but when energized alone urge the motor to rotation in opposite direction each from the other, and a circuit controller under the joint control of said member and cam for causing selective energization of said winding depending upon the sense of the movement of said movable member and energization of the selected winding for an increment of time corresponding to the non-lineal function of the variable.

6. In a torque amplifying mechanism for positioning a work shaft in accordance with a function of a variable, in combination, a member movable in proportion to said variable, a work shaft, a cam driven by said shaft and corresponding with the functional relation between said function and variable, a circuit controller under the joint control of said cam and member, and a motor for revolving said shaft and cam under the control of said circuit controller whereby said motor is effectively energized and said shaft revolved for increments of time corresponding to the function of the variable.

7. In a torque amplifying mechanism for positioning a work shaft in correspondence with a function of a variable, in combination, a member movable in proportion to the variable, a work shaft, a cam driven by said shaft and corresponding with the functional relation between said function and variable, a circuit controller under the joint control of said cam and member, and a motor for positioning said shaft and cam under the control of said circuit controller whereby said shaft is positioned in correspondence with the function of the variable.

HARRY E. WEAVER.